US011536045B2

(12) United States Patent
Díez Cornejo (10) Patent No.: US 11,536,045 B2
(45) Date of Patent: Dec. 27, 2022

(54) METHOD FOR INSTALLING A HOLLOW CONCRETE TOWER MADE FROM MORE THAN ONE SEGMENT AND CORRESPONDING HOLLOW CONCRETE TOWER

(71) Applicant: BYO TOWERS, S.L., Madrid (ES)

(72) Inventor: Alfonso Díez Cornejo, Madrid (ES)

(73) Assignee: BYO TOWERS, S.L., Madrid (ES)

( * ) Notice: Subject to any disclaimer, the term of this patent is extended or adjusted under 35 U.S.C. 154(b) by 0 days.

(21) Appl. No.: 15/311,994

(22) PCT Filed: Sep. 25, 2015

(86) PCT No.: PCT/EP2015/072179
§ 371 (c)(1),
(2) Date: Nov. 17, 2016

(87) PCT Pub. No.: WO2016/066345
PCT Pub. Date: May 6, 2016

(65) Prior Publication Data
US 2017/0089090 A1    Mar. 30, 2017

(30) Foreign Application Priority Data

Oct. 30, 2014   (EP) .................................. 14382427

(51) Int. Cl.
*E04H 12/34*      (2006.01)
*E04H 12/12*      (2006.01)
(Continued)

(52) U.S. Cl.
CPC ......... *E04H 12/341* (2013.01); *E04C 5/0622* (2013.01); *E04H 12/12* (2013.01);
(Continued)

(58) Field of Classification Search
CPC ....... E04C 5/0622; E04G 15/00; E04H 12/12; E04H 12/16; E04H 12/341; E04H 12/342; F03D 13/10; F03D 13/20; Y02E 10/728
(Continued)

(56) References Cited

U.S. PATENT DOCUMENTS 1,122,350 A * 12/1914 Wysong ........................ 144/347
2,520,221 A *  8/1950 Ponty .................... E04B 1/6179
                                                          403/314
(Continued)

FOREIGN PATENT DOCUMENTS

DE   10 2009 058124 A1   6/2011
EP       0960986 A2      12/1999
(Continued)

OTHER PUBLICATIONS

The International Search Report of the corresponding International Application, PCT/EP2015/072179 dated Dec. 9, 2015.

*Primary Examiner* — Brian E Glessner
*Assistant Examiner* — James Buckle, Jr.
(74) *Attorney, Agent, or Firm* — Cowan, Liebowitz & Latman, P.C.; Mark Montague (57) ABSTRACT

Method for installing a hollow concrete tower comprising the following steps: a) arranging a platform on a site; b) arranging on said platform at least one partial full-segment mould in a position such that the segment axis of the segment being cast in said mould is substantially vertical; c) pouring concrete inside said arranged partial mould(s); d) allowing the poured concrete to set to working strength, generating corresponding segment(s); e) removing the arranged mould(s) with concrete set to working strength, to leave the corresponding segment(s) exposed; f) assembling said corresponding exposed segment(s); and g) optionally, repeating steps b)-f) at least once.

7 Claims, 5 Drawing Sheets

(51) Int. Cl.
*E04H 12/16* (2006.01)
*F03D 13/20* (2016.01)
*F03D 13/10* (2016.01)
*E04C 5/06* (2006.01)
*E04G 15/00* (2006.01)

(52) U.S. Cl.
CPC ........... *E04H 12/16* (2013.01); *E04H 12/342* (2013.01); *F03D 13/10* (2016.05); *F03D 13/20* (2016.05); *E04G 15/00* (2013.01); *F05B 2240/912* (2013.01); *Y02E 10/728* (2013.01)

(58) Field of Classification Search
USPC ................. 52/127.3, 742.14, 745.17, 745.18
See application file for complete search history.

(56) References Cited

U.S. PATENT DOCUMENTS

| | | | | |
|---|---|---|---|---|
| 2,882,714 | A * | 4/1959 | Gagle | E04F 15/10 405/270 |
| 6,357,194 | B1 * | 3/2002 | Jones, Jr. | F16B 12/125 248/223.41 |
| 6,427,414 | B1 * | 8/2002 | Wing | E04F 13/10 52/233 |
| 7,963,038 | B2 * | 6/2011 | Schmitz | B64C 9/02 29/428 |
| 2008/0040983 | A1 * | 2/2008 | Fernandez Gomez | E04H 12/12 52/40 |
| 2009/0031639 | A1 * | 2/2009 | Cortina/Cordero | E04H 12/12 52/40 |
| 2013/0081337 | A1 * | 4/2013 | Zavitz | E04H 12/344 52/123.1 |
| 2013/0243531 | A1 * | 9/2013 | Fernandez Gomez | E02B 17/025 405/207 |
| 2014/0033628 | A1 * | 2/2014 | Lockwood | E04H 12/16 52/223.5 |
| 2014/0044554 | A1 * | 2/2014 | Lafferty | E02D 27/42 416/244 R |
| 2014/0102039 | A1 * | 4/2014 | Wagner | E04H 12/342 52/745.18 |
| 2016/0025074 | A1 * | 1/2016 | Sato | F03D 9/25 405/224 |
| 2016/0169192 | A1 * | 6/2016 | Aranzadi De Miguel | E04H 12/12 52/30 |
| 2017/0218652 | A1 * | 8/2017 | Neighbours | E04H 12/12 |
| 2017/0314284 | A1 * | 11/2017 | Fabry | E04H 12/12 |

FOREIGN PATENT DOCUMENTS

| | | |
|---|---|---|
| ES | 2565518 A1 | 4/2016 |
| GB | 619048 A | 3/1949 |
| WO | 2007/025555 A1 | 3/2007 |
| WO | 2012/168467 A2 | 12/2012 |

* cited by examiner

METHOD FOR INSTALLING A HOLLOW CONCRETE TOWER MADE FROM MORE THAN ONE SEGMENT AND CORRESPONDING HOLLOW CONCRETE TOWER

FIELD OF THE INVENTION

The present invention relates to a method for installing a hollow concrete tower made from more than one segment and to a corresponding hollow concrete tower. More specifically, the present invention relates to a method for installing a hollow concrete tower that is particularly suitable for the successive implementation of said method a number of times in order to install a plurality of large hollow concrete towers in a specified geographical area. Accordingly, the present invention relates to a method particularly suitable for installing a plurality of hollow concrete towers meant to support respective wind turbines for industrial use (or industrial wind turbine concrete towers) in a wind farm. The present specification will make repeated reference to said specific application of the present invention without this constituting a limitation of the scope thereof.

Consequently, the present invention is mainly applicable in the construction industry, particularly construction in concrete, in combination with the renewable or green energy industry, specifically wind power.

BACKGROUND OF THE INVENTION

Various systems are known for installing hollow concrete towers. These installation systems mainly differ in the processes executed from the time of pouring the concrete used to make the tower itself until the tower reaches the shape and strength required to install the wind turbine.

Prior to installing a hollow concrete tower, corresponding foundations must be installed. Foundations installation may be supplemented within a same process with a stage actually belonging to the tower installation, namely a base segment assembly stage directly on the site, resting on the foundations (see for example DE 102009058124 A1). The present invention relates to a method for installing a hollow concrete tower, and does not include stages relating to the installation of corresponding foundations.

For sake of clarity, some concepts will be defined as follows for the purposes of the present specification:

Site: The ground surface area occupied by the vertical projection of the shaft of a hollow concrete tower once installed. The site therefore defines a site axis, essentially vertical, along which the shaft of the corresponding hollow concrete tower extends.

Platform: The working area located immediately adjoining or surrounding the site, excluding the site itself, in which various activities are performed in order to install a hollow concrete tower.

Part: Each one of the elements integrating the shaft of a hollow concrete tower. Due to the extremely large dimensions of current hollow concrete towers, the latter are generally made from a plurality of parts.

Segment: A part or group of parts that form a complete horizontal cross-section of the shaft of a hollow concrete tower but only part of the height thereof. When installed, each segment therefore has a segment axis, substantially vertical, that is coaxial with the site axis. Due to the extremely large dimensions of current hollow concrete towers, these segments are generally made from a plurality of parts. Of the segments that make up an hollow concrete tower, the bottom segment will be referred to herein as the base segment and the remaining segments will be referred to herein as elevation segments.

Factory: The auxiliary infrastructure used to precast concrete parts for a hollow concrete tower.

Transportation: The transport of parts from a factory to a platform by means of a motor vehicle.

Assembly: The process performed using a crane placed on the platform to handle parts in general, placing the parts in their installed position in a hollow concrete tower.

The above terms are used to differentiate the following installation systems for hollow concrete towers intended to be industrial wind turbine concrete towers:

A) Towers Precast at a Distance From Site Cleared by Means of Transportation

In this case the tower is made of different parts precast in moulds in a factory. This factory can be located at a far or near distance from the site, therefore requiring a transportation stage from the location where the parts are cast to the installation location.

The importance of the transportation operation will depend on the distance from the factory, from both a logistical standpoint and with respect to the costs of installing the tower. With regard to this distance, completely opposite situations can exist: short distances in which a factory is installed in the wind farm itself, or large distances requiring a complex logistical chain and even including a combination of ground and maritime transport in case of being in different continents.

With this installation system, the parts finally arrive at the site on a truck, and subsequently enter the corresponding assembly.

It should be noted that the transportation stage is a limiting factor in the design of the tower, as depending on the transportation constraints (regarding both national regulations and the available units) it may be necessary to make larger or smaller parts, correspondingly including more or fewer joints in both of the main dimensions of the tower, that is, horizontal joints at a specified height or vertical joints at a specified azimuth.

In addition, the existence of the transportation stage makes it advisable to minimise the volume of concrete used in the tower, thereby requiring stronger concrete, and in some cases even requiring that the tower be built with high-strength concretes that are both more expensive and more difficult to obtain or produce depending on the geographical location of the wind farm. In addition, the presence of horizontal and, if applicable, vertical joints requires significant wall thickness values in order to house the kits that provide load continuity at the joint. This in turn requires over-dimensioning the wall thickness, at least in the areas near the joints, with the resulting increase in cost, particularly for expensive concretes. Moreover, the joints themselves require a mortar that is generally more expensive than the concrete employed. If entire segments will be transported, the conventional diameters of the lower heights of the towers (typically greater than 6.5 m) make the segments essentially incompatible with the track gauge for logistical reasons. Similarly, maximum height clearances for conventional road transportation require using parts with small dimensions, which implies a large number of operations in the assembly process. For example, normal transportation regulations imposing maximum dimensions of 2.4 m×12 m and loads of 25 t per truck mean that for a tower with height of 120 m it could be necessary to transport and assemble over 40 parts.

Furthermore, in the transportation stage the parts are handled during loading and unloading and usually deposited in temporary storage locations. During these manoeuvers and deposits the parts are often supported horizontally, which may place demands on the parts that are above the design specifications thereof in the installed condition; this may in turn require over-dimensioning certain part parameters in order to withstand said demands, such as the reinforcement. In addition, this situation may require installing bushings in the parts for anchoring to the means used to support the parts in a horizontal position, which requires not only using said subsequently superfluous bushings but often also requires subsequent rendering work to hide said bushings. This also increases the complexity of the design of each part.

Indeed, particularly when there are vertical joints, a preassembly stage is occasionally performed between transportation and assembly to form segments from several parts, lengthening the installation method and again potentially placing demands on the parts greater than the design specifications thereof for the installed condition.

Consequently, this installation system requires both transportation and assembly.

See for example WO 2012/168467 A2.

B) Towers Erected on Site

These are towers in which the concrete is cast in formwork placed such that the concreted element obtained after hardening is a part in installed condition, that is, the tower is moulded directly on site in its entire vertical extension, pouring the concrete in the same location. In this case no parts are manufactured in a factory, nor is it necessary to transport or assemble (or preassemble) any parts, as the parts themselves form the tower in the installed condition as they are made.

However, with regard to towers which can reach heights over 100 m, in practice it is not possible to concrete the entire tower all at once. One of the problems involves handling the full vertical length of the formwork, and particularly carrying the concrete to the height of the top of the formwork to allow pouring said concrete into the formwork. To minimise this problem, partial formworks are used with a height that is a fraction of the full height of the tower, which are then carried upward as the concreted parts set. Normally the partial formworks have a configuration defining a full segment. Concentrating all the production processes (casting, reinforcing and concreting) in the same vertical line conditions the production rate and complicates the industrialisation of the installation method, resulting in long installation times for a tower due to the time required for the concrete to set between one segment and the next, as well as the removal and positioning of the formwork in order to move it upward. The installation of a tower over 100 m high using this system generally lasts at least 20 days, using formwork with 6-metre self-hoisting climbing plates. In addition, the installation of a plurality of towers is either extremely slow if performed in series, moving the formwork consecutively from one site to another, or very expensive if performed in parallel at several sites, as it is necessary to have as many formworks as there are simultaneous sites. See for example EP 0960986 A2.

High-tech hoisting or sliding formworks have been designed which speed up the process but imply high complexity of the formwork, specially for conventional towers, as these towers have a shape that tapers vertically which requires changing the morphology of the formwork as it is moved upward.

Consequently, in this installation system there is no transportation or assembly.

An special system to erect on site a tower comprises extrusion of the shaft of the tower. The system comprises installing a single segment, in particular a base segment, with a closed lower rim and an open upper rim, wherein concrete is injected into said base segment until overflowing beyond said open upper rim. This concept implies injection being performed at a certain speed suitable for the concrete overflowing beyond the open upper rim of the base segment to set up to an extent so as to maintain a cylindrical shape. However, this is not a wide-spread system actually, mainly due to the fact that building specially high towers, such as industrial wind turbine concrete towers, requires an extremely high power consumption in order to pump concrete up to heights over 100 m and very long installation times as the concrete setting rate leads to inject concrete at a correspondingly low rate. See for example WO 2007/025555 A1 and GB 619048.

In any case, it remains that in this installation system there is no transportation or assembly.

C) Combined Towers

It is possible to combine the aforementioned techniques, particularly for tapered towers, forming the bottom parts of the tower on site and the rest of the tower using prefabricated parts. On one hand the complexity of the hoisting formwork is reduced, as the need to modify the morphology of the formwork is limited, since the more distant positions in which the formwork will be used require dimensions that are more similar to one another, while at the same time the limitations resulting from the transportation of the parts are reduced, since the rings of the tower with the largest diameter is formed on site. It is even possible to manufacture the tower on site to a height such that it is technically and legally possible to transport the remaining parts in the form of segments.

However, a person skilled in the art will understand that this system has the drawbacks of both of the aforementioned systems, albeit reduced, as one stage is cumbersome and slow due to the formwork-pouring-setting process for previous segments and the other stage requires transporting objects with a large size or in great number.

SUMMARY OF THE INVENTION

The present invention provides in a first aspect thereof a method for installing a hollow concrete tower made from more than one segment, particularly suitable for successive implementation a number of times in order to install a plurality of large hollow concrete towers in a specific geographical area, such as a plurality of hollow concrete towers for supporting industrial wind turbines (or industrial wind turbine concrete towers) for a wind farm.

More specifically, the present invention provides a method for installing a hollow concrete tower made from more that one segment, comprising the following steps in any order technically possible:

a) arranging a site and a corresponding platform;

b) arranging on said platform at least one partial full-segment mould in a position such that the segment axis of the segment to cast in said arranged mould(s) is substantially vertical;

c) pouring concrete inside said arranged partial mould(s);

d) allowing the poured concrete to set to working strength, generating corresponding segment(s);

e) removing said arranged mould(s) with concrete set to working strength, to leave said corresponding segment(s) exposed;

f) assembling said corresponding exposed segment(s); and g) optionally, repeating steps b)-f) at least once.

Preferably, step g) is carried out for completely installing a hollow concrete tower according to the present invention, and more than one cycle of steps b)-f) are therefore performed: in a step b) only part of the full-segment partial moulds adapted for generating all segments are arranged on said platform, for example two full-segment partial moulds, and then corresponding steps c)-f) are carried out; next, in another step b) only other part of the full-segment partial moulds adapted for generating all segments are arranged on said platform, for example another two full-segment partial moulds, and then corresponding steps c)-f) are carried out; and so on until a desired number of cycles of steps b)-f) have been performed, normally to fully install a corresponding tower. The amount of full-segment partial moulds involved in a cycle may increase or decrease from one cycle to another. There is no need to fully conclude a cycle of steps b)-f) in order to start with another cycle of steps b)-f).

Alternatively, in only one step b) the full-segment partial moulds adapted to generate all the segments of the corresponding tower may be arranged in said platform, so that step g) would be omitted.

Optionally, according to the present invention, one of the moulds can be arranged at the site instead of on the platform, to generate the base segment directly on site.

Hollow concrete towers according to the present invention can include in their concrete walls an inner passive reinforcement made of conventional rebar, sometimes shared by more than one segment, such as to improve the tensile strength of the concrete. In these cases, the method of the present invention can include the following step:

after the mould arranging step and before the concrete pouring step, placing passive reinforcement inside said mould(s).

Similarly, hollow concrete towers according to the present invention can include in the walls thereof an inner active reinforcement made of active steel rods or pre-stressing wire, sometimes shared by more than one segment, such as to improve the tensile strength of the concrete and/or as attachment means between the shared segments. In such cases, the method of the present invention can include the following steps:

i) in case of adherent active reinforcement (bare cable):
after the mould arranging step and before the concrete pouring step, arranging inside said mould(s) sheaths acting as ducts for the adherent active reinforcement, such that in adjacent segments in the installed condition there will be sheaths aligned with one another in both adjacent segments, and after the setting step, arranging adherent active reinforcement through aligned sheaths;

ii) in case of non-adherent active reinforcement (sheathed cable):
after the mould arranging step and before the concrete pouring step, arranging inside said mould(s) non-adherent active reinforcement such that part of the non-adherent active reinforcement protrudes from a corresponding mould, as well as inserts for generating cavities in the segment to be cast, such that in adjacent segments in the installed condition there will be cavities in one adjacent segment and protrusions in other adjacent segment aligned with one another;

iii) in the case of adherent or non-adherent active reinforcement:
arranging retaining means at a first end of the active reinforcement, after the active reinforcement arrangement step, arranging traction means at a second end of the active reinforcement to stress it, after the setting step, actuating said traction means to stress the active reinforcement, after the traction step, arranging means for anchoring the active reinforcement to the concrete, after the anchoring step, removing said traction means from said active reinforcement.

In the case of an adherent active reinforcement, preferably mortar is poured into the sheaths once the reinforcement is housed therein and sheaths have outer corrugations; in the case of a non-adherent active reinforcement, preferably mortar is poured into the cavities once the reinforcement is housed therein.

Finally, hollow concrete towers according to the present invention can include active reinforcements external to the tower walls, running on the inside of the tower, occasionally shared by more than one segment, for example in order to improve the tensile strength of the concrete and/or as tightening means between the shared segments. In these cases, the method of the present invention can include the following steps:

after the assembly step, arranging external active reinforcement such that the wires or rods forming said external active reinforcement are anchored on one end to the bottom of the tower and on the other end to an upper point of the tower.

It should be noted that the installation method described above may be used to install a mixed tower, that is, a tower made from concrete only along a part of its height, and made of metal, specially steel, along the rest of its height, without thereby departing from the scope of the invention.

It can be seen that the installation method according to the present invention is a method based on onsite fabrication, such that:

This is a prefabricated type solution in the sense that the tower is composed of elements that are previously concreted and subsequently installed in the final position thereof by assembly. This feature allows maintaining the benefits related to production efficiency, as it permits overlapping production activities, such that production times can be reduced and optimised.

The absence of road transport of parts and thus of the corresponding dimensional constraints thereon provides flexibility in the shape of the parts. This is an essential feature in order to define geometrically larger parts and to hence allow manufacturing the tower without the need for vertical joints or preassembly, which in turn allows optimizing the overall costs for installing a tower. This is, the parts will be segments themselves, preferably with a tubular shape, such that only horizontal joints are present.

Paradoxically to a person skilled in the art, despite this being a method using a sort of prefabricated elements, the method for installing a hollow concrete tower according to the present invention produces a tower with fewer discontinuities and free of over-thicknesses sometimes required in towers of other systems to house devices of the joints and the like. In addition, the parts are self-supporting and the method of the invention does not place requirements on the parts greater than those for which the parts are designed in the installed condition, since the parts are not fabricated in the installed conditions but have their segment axes in a vertical position.

The present invention provides, in a second aspect thereof, a hollow concrete tower installed in accordance with the method for installing a hollow concrete tower described above.

BRIEF DESCRIPTION OF DRAWINGS

The features and advantages of the invention will become clearer from the following detailed description of embodiments thereof, described by way of non-limiting example with reference to the accompanying drawings, where.

DETAILED DESCRIPTION OF EMBODIMENTS

Figure 1:
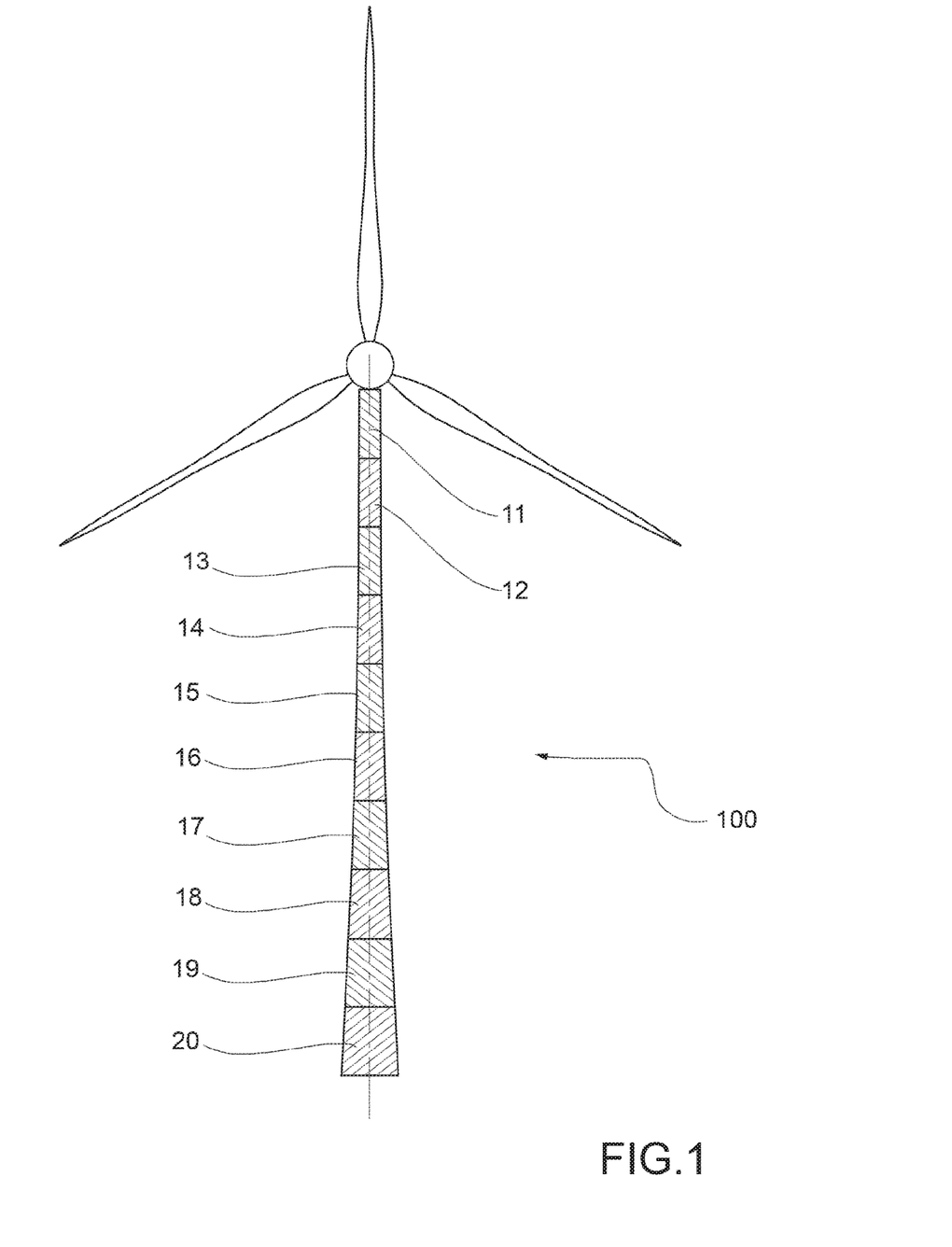
FIG. 1 is an elevation view of an industrial wind turbine concrete tower installed according to an embodiment of the installation method for a hollow concrete tower of the present invention.

FIG. 1 shows a generic industrial wind turbine concrete tower 100, with a height of 115 m, installed according to the hollow tower installation method of the invention. The tower 100 comprises ten segments, specifically a base segment 20 and nine elevation segments 11-19, each one having a truncated cone shape. Each of the segments 11-20 is 11.50 m high.

A truncated cone is defined by the following parameters:
φtop: diameter at the upper level
φbot: diameter at the bottom lever
H: height of the truncated cone
Tw: thickness of the wall of the truncated cone.

Depending on the tower to build according to the wind turbine manufacturer, different shapes will be defined by changing the variables φtop, φbot, Tw and H.

In this way, the generic geometrical description for a tower is given by the following table:

| SEGMENT | $Z_{bot}$ | $Z_{top}$ | $\phi_{bot}$ | $\phi_{top}$ | H ($Z_{top} - Z_{bot}$) |
|---|---|---|---|---|---|
| T1 | Z0 | Z1 | φ0 | φ1 | H1 |
| T2 | Z1 | Z2 | φ1 | φ2 | H2 |
| T3 | Z2 | Z3 | φ2 | φ3 | H3 |
| ... | ... | ... | ... | ... | ... |
| Tn | Zn − 1 | Zn | φn − 1 | φn | Hn |

As a general parameter a maximum segment height of 11.50 m is preferred, such that all the structures involved in the production of the segments will clearly fulfil the road transport requirements and can be transported in conventional trucks with 12 m beds. The number of segments needed is defined by said maximum height segment and the height of the tower (H($Z_n - Z_0$)). It is also preferred that the tower includes at least one segment wherein the height of said segment is greater than the maximum diameter thereof, in order to minimize the number of segments needed to build a tower with a given height.

Figure 2:
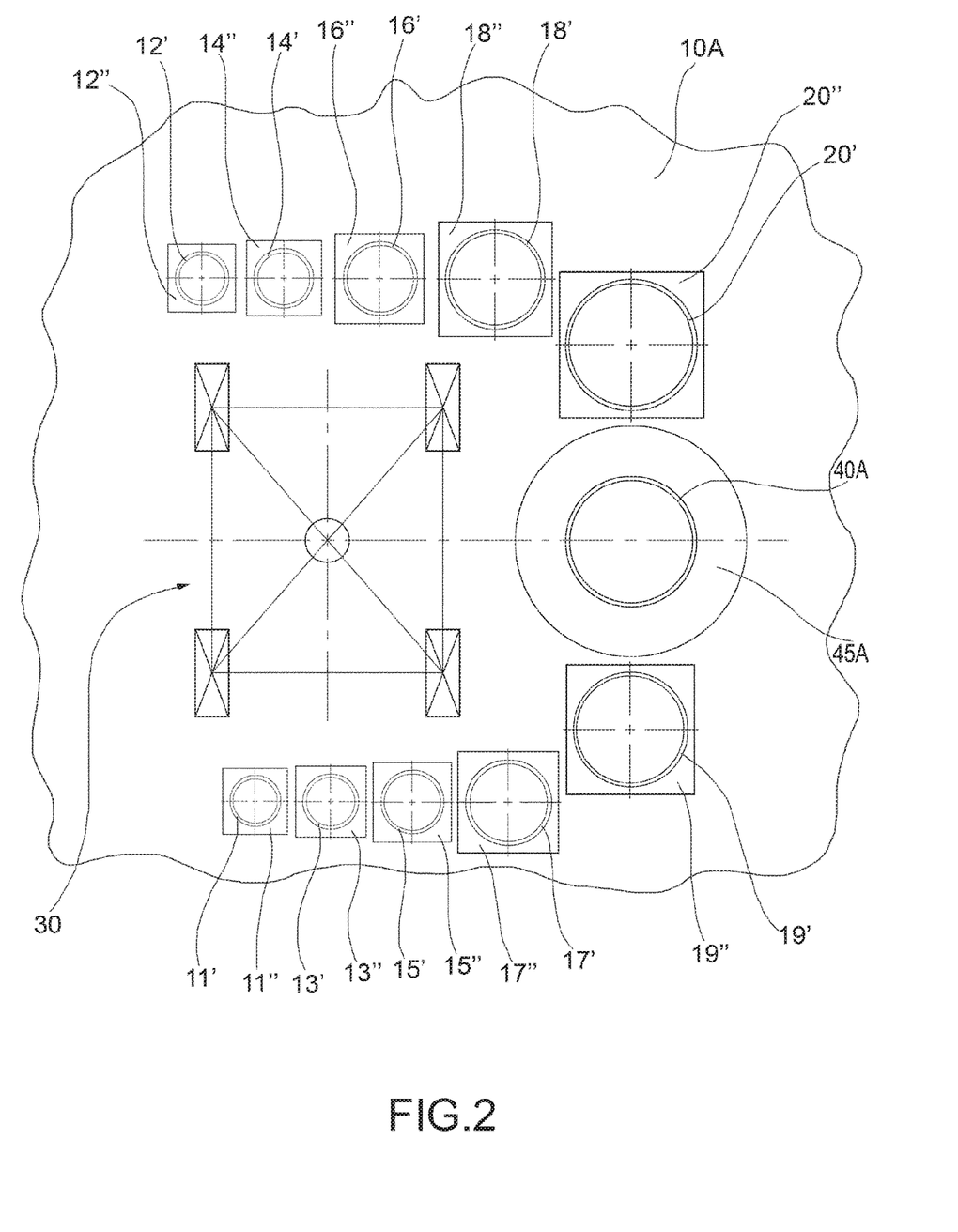
FIG. 2 is a plan view of an embodiment of the mould arrangement according to the present invention.

FIG. 2 shows a platform 10A, a site 40A, ten partial moulds 11'-20', 11"-20" for a complete segment, a site 40A and a crane 30, adapted to execute an embodiment of the method according to the present invention for the installation of the tower 100. More specifically, the platform 10A is placed surrounding said site 40A and supporting said crane 30; and each mould comprises a corresponding concrete supporting slab 11"-20" that rests on said platform 10A, and a corresponding mould body 11'-20' that rests on a corresponding slab 11"-20". Said moulds 11'-20', 11"-20" are arranged in two rows essentially symmetrical to each other that start at said site 40A in diametrically opposite directions and then turn towards said crane 30 to embrace said crane 30 laterally. Said moulds 11'-20', 11"-20" are meant to cast said base segment 20 and said elevation segments 11-19 respectively, and consequently the mould bodies 11'-20' have shapes that are complementary to same. Said site 40A is located at the centre of foundations comprising a footing 45A. In this embodiment, said slabs 11"-20" have a quadrangular shape and said footing 45A has a circular shape, but a person skilled in the art will understand that these elements can have different shapes without departing from the scope of the invention.

Figure 3:
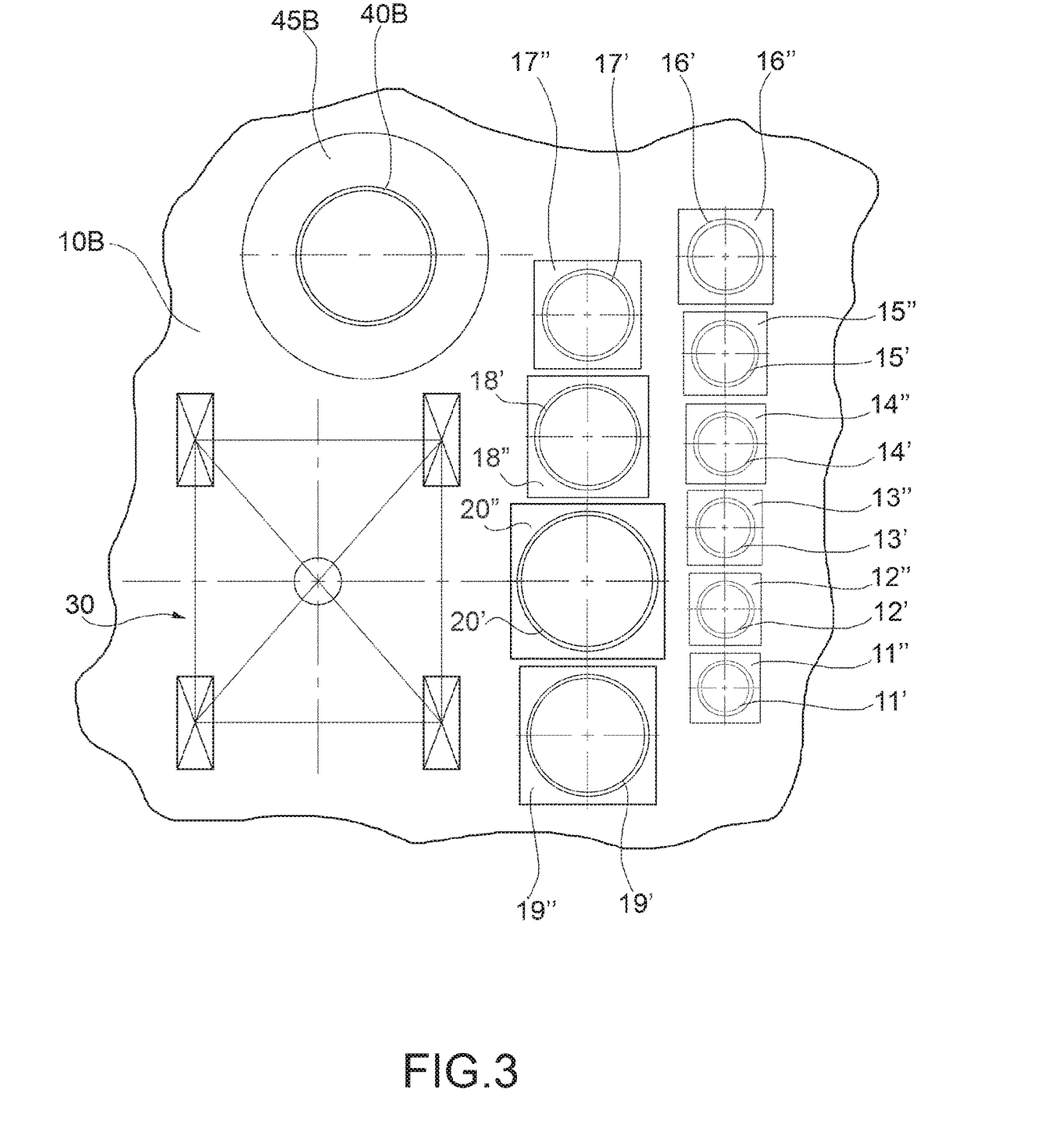
FIG. 3 is a plan view of an embodiment of an alternative mould arrangement according to the present invention.

FIG. 3 shows a platform 10B, a site 40B, ten partial moulds 11'-20', 11"-20" for a complete segment, a site 40B and a crane 30, adapted to execute an embodiment of the method according to the present invention for the installation of the tower 100. More specifically, platform 10B is placed immediately adjacent to said site 40B and supports said crane 30; and each mould comprises a corresponding concrete support slab 11"-20' that rests on said platform 10B, and a corresponding mould body 11'-20' that rests on a corresponding slab 11"-20". Said moulds 11'-20', 11"-20" are arranged in two rows essentially parallel to each other that leave said site 40B and said crane 30 on the same side of said rows. Said moulds 11'-20', 11"-20" are meant to cast each base segment 20 and said elevation segments 11-19 respectively; consequently, the mould bodies 11'-20' have shapes that are complementary to same. Said site 40B is located at the centre of foundations comprising a footing 45B. In this embodiment, said slabs 11"-20" have a rectangular shape and said footing 45B has a circular shape, but a person skilled in the art will understand that these elements can have different shapes without departing from the scope of the invention.

The supporting slabs can be prefabricated by pieces. That is, for each supporting slab it is possible to prefabricate supporting slab portions which, when transported to a platform and placed adjacent to each other, jointly form the corresponding supporting slab. Consequently, it is possible for each portion of the supporting slab to have dimensions appropriate for conventional road transport. In the specific embodiments described and depicted herein, the slabs 11"-20" have been prefabricated in four portions, such that the dimensions of each portion are suitable for conventional road transport. In this way, slabs 11"-20" are transported in portions on trucks to platform 10A or 10B and can be subsequently transported in portions on trucks to other platforms (such as platform 10B or 10A, respectively) such that they can be reused in other methods for installing several towers. Notwithstanding the above, in light of the disclosure of the present specification, a person skilled in the art will understand that these slabs can be provided in other ways without departing from the scope of the invention.

In the specific embodiments described and depicted herein, as shown in FIGS. 2 and 3, the moulds 11'-20', 11"-20" are distributed throughout the area of platform 10A;

10B such that the arm of the crane 30, when handling the segments obtained from moulds 11'-20', 11"-20", is shorter the larger and therefore heavier the resulting segment is. However, in light of the disclosure of the present specification, a person skilled in the art will understand that the moulds can be distributed throughout the area of a platform in other ways without departing from the scope of the invention.

An embodiment of the method according to the present invention for the installation of a hollow concrete tower will be described below with reference to the figures.

Figure 4:
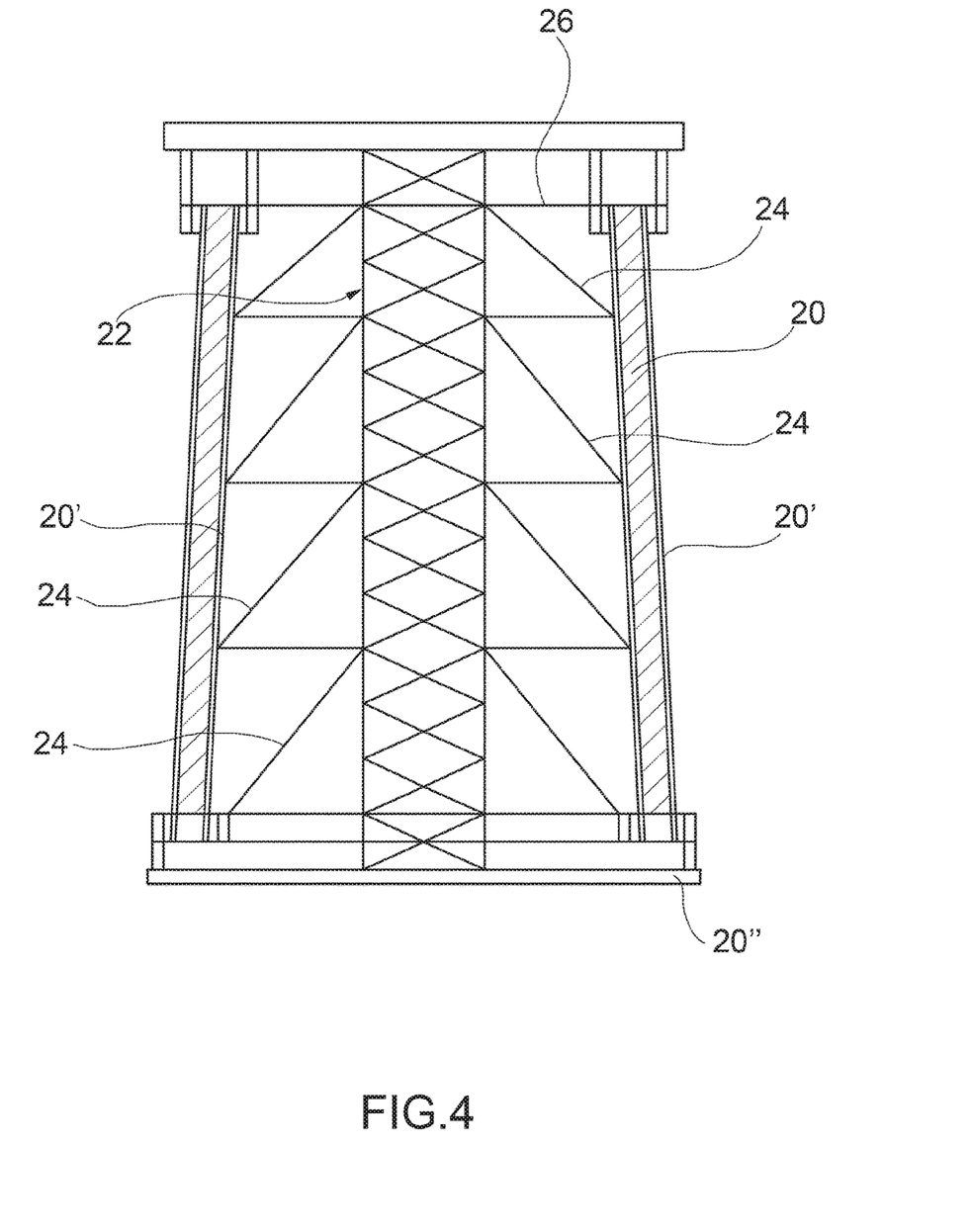
FIG. 4 is a schematic vertical cross-sectional view of a mould embodiment according to the present invention.
Figure 5:
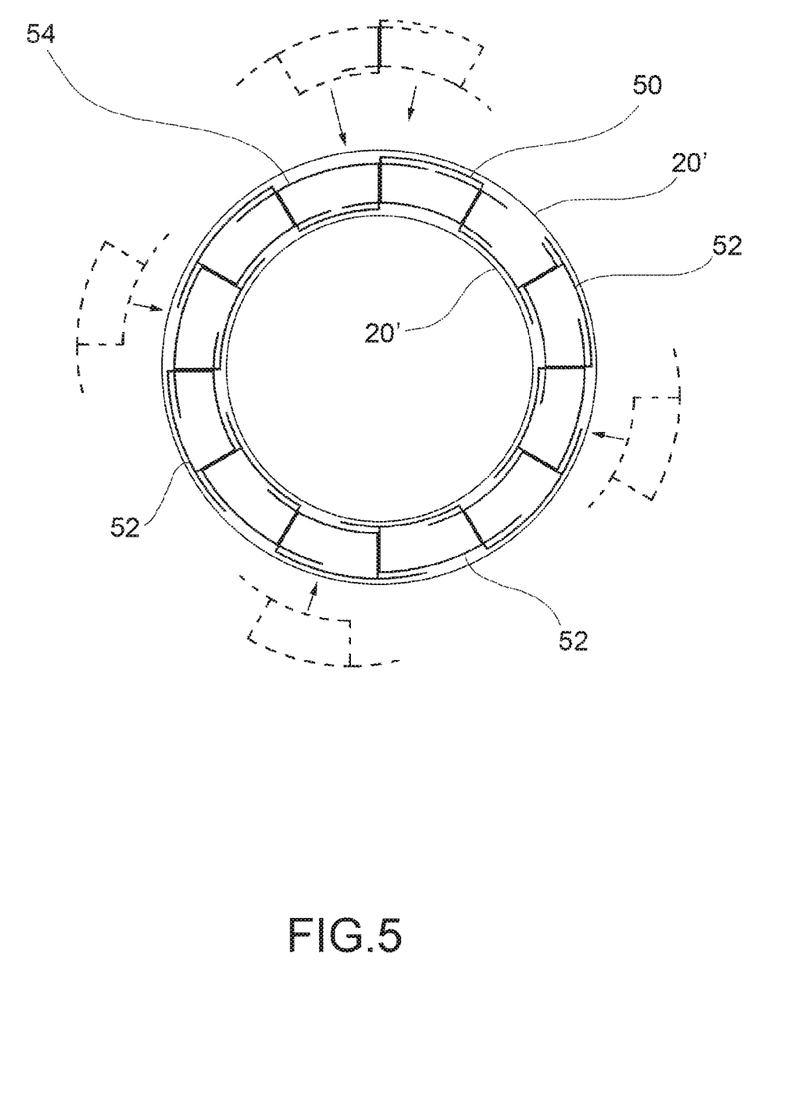
FIG. 5 is a schematic horizontal cross-sectional view of an embodiment of a tower segment according to the present invention.

FIGS. 4 and 5 aid the description by illustrating views corresponding to only one of the moulds 11'-20', 11"-20", specifically mould 20', 20". It will be understood that, on a different scale and potentially tapering, FIG. 4 and FIG. 5 will be analogously applicable to other moulds for purposes of illustration only. It will also be understood that FIG. 4 is symmetrical with respect to the central vertical axis thereof, such that the references attributed to the features on one side of the axis will also apply to the symmetrical features, which references are omitted in FIG. 4 for sake of clarity.

Firstly, platform 10A; 10B is arranged on a site 40A; 40B intended for a tower 100, which requires levelling and compacting the ground within the limits of said platform 10A; 10B and placing a foundation 45A; 45B for the tower 100 in correspondence with the location of the site 40A; 40B. Then it is ensured that platform 10A; 10B is level within design tolerances and, if necessary, the levelling is completed using a sand bed to provide uniform support.

Then the ten full segment partial moulds 11'-20', 11"-20" are arranged in said platform 10A; 10B, at positions that do not coincide with said site 40A; 40B. Since the moulds 11'-20', 11"-20" are arranged at positions that do not coincide with said site 40A; 40B, the resulting segments 11-20 must be assembled to create a tower 100. Specifically, for each mould first the corresponding slab 11"-20" is arranged in place by positioning the component portions thereof adjacent to each other; and then the corresponding body 11'-20' of the mould is placed on the corresponding slab 11"-20". Said slabs 11"-20" comprise, embedded therein, registers for attaching the mould bodies 11'-20'. More specifically, using mould 20', 20" as an example, in order to place the mould body 20' first a shoring formed by a central metal lattice frame 22 is placed at the centre of the slab 20", which shoring coincides with the axis of the resulting segment 20, and a plurality of arms 24, 26 that extend radially from said central frame 22; then the inner wall of the mould body 20' is placed, attached to both registers of the slab 20" and to the radially external ends of the bottom arms 24 of said plurality of arms; and the outer wall of the mould body 20' is then provided, attached to both registers of the slab 20" and to the radially external ends of the upper arms 26 of said plurality of arms.

In the specific embodiments described and depicted herein, the inner wall of the mould body 20' is formed by various panels, each one of which has dimensions appropriate for conventional road transport, and the outer wall of the mould body 20' is formed by various panels, each one of which has appropriate dimensions for conventional road transport.

Said shoring 22, 24, 26 has adjustment means that allow correcting any misalignment with respect to the segment axis.

If a segment needs to have a rebar, said rebar is fitted after placing the inner wall of the mould body and before placing the outer wall of the mould body. The rebar is preferably supplied from an auxiliary infrastructure by truck to the platform, and once in the platform mounted in its final position. For this purpose, the rebar is supplied divided into prefabricated elements, complementary to one another, each one with appropriate dimensions for conventional road transport.

In the specific embodiments described and depicted herein, as shown particularly in FIG. 5, segment 20 is made with rebar. This rebar is divided into cages 50, 52, 54, each cage having dimensions appropriate for conventional road transport. The cages 50, 52, 54 are complementary to each other, that is, the configuration thereof is such that said cages overlap and are self-supporting. Specifically, initially a first cage 50 is placed provided with two radially internal overlapping arms that run from the central body of the initial cage 50 in circumferentially opposite directions; then, a plurality of intermediate cages 52 are placed, each one having two overlapping arms, one radially internal and one radially external, which run from the central body of each intermediate cage 52 in circumferentially opposite directions; and finally a final cage 54 is placed provided with two radially external overlapping arms that run from the central body of the final cage 54 in circumferentially opposite directions.

After positioning the moulds 11'-20', 11"-20" with the rebar 50, 52, 54 inside, said moulds 11'-20', 11"-20", and more specifically the mould bodies 11'-20' are concreted, preferably by pouring concrete using a mixer truck and a pump, in a known manner. The poured concrete is allowed to set to its working strength, thereby generating the segments 11-20.

Then the mould removal is performed, first for the outer walls of the mould bodies 11'-20' and then the inner walls of the mould bodies 11'-20'. According to the specific embodiments described and depicted herein, after the de-moulding step, as usual in this type of methods, the moulds 11'-20', 11"-20" are cleaned and the de-moulding primer is applied to the mould bodies 11'-20' for the next use. Next the shoring 22, 24, 26 is dismantled for the next use.

To complete the preparation of the segments 11-20, on the top edge of each segment 11-20 the usual pair of sealing profiles is fitted, specifically a radially external sealing profile and a radially internal sealing profile, acting as a stopper for the high-strength mortar when making the joints between the segments after assembly thereof. This profile installation step can also be performed during the segment assembly, that is, the sealing profile pairs can be placed such that a pair of sealing profiles of one segment may be placed after assembling the corresponding segment and before assembling the next segment.

Then the segments 11-20 are assembled with the crane 30. For this purpose, the crane successively positions the segments 11-20 one on top of the other, starting with the segment 20 with the greatest diameter, which is placed directly on the site 40A; 40B and therefore acts as a base segment, followed by the remaining segments 11-19, which are placed in order of decreasing diameter establishing the elevation segments.

In parallel to the assembly, the joints created between pairs of assembled segments, and more specifically the gaps created by the pairs of sealing profiles, are filled with high-strength mortar in order to attach each segment to the adjacent segments.

Finally, in the specific embodiments described and depicted herein, the tower is pre-stressed, fitting either adherent active inner reinforcement, non-adherent active inner reinforcement, or external active reinforcement in the form of tendons that run inside the tower. This step is not described or depicted as it is known to those skilled in the art.

In the specific embodiments described and depicted herein, the ten moulds 11'-20', 11"-20" are arranged substantially simultaneously on platform 10A; 10B so that the installation method is carried out in a single cycle of ten moulds 11'-20', 11"-20". However, as an alternative, the installation method may be carried out by initially arranging only a part of the moulds, for example two moulds 19'-20', 19"-20", and then carrying out the remaining steps of the method for those two moulds 19'-20', 19"-20"; by subsequently arranging another part of the moulds, for example another two moulds 17'-18', 17"-18", and then carrying out the remaining steps of the method for those two moulds 17'-18', 17"-18"; by subsequently arranging another part of the moulds, for example another three moulds 14'-16', 14"-16", and then carrying out the remaining steps of the method for those three moulds 14'-16', 14"-16"; and by finally arranging the remaining part of the moulds, in this example moulds 11'-13', 11"-13", and then carrying out the remaining steps of the method for those three moulds 11'-13', 11"-13". In this exemplary alternative, the method is therefore carried out in four cycles of 2-2-3-3 moulds, but the method may be carried out also with any other combination of cycles and moulds (for example, five cycles of 2-2-2-2-2 moulds, three cycles of 3-3-4 moulds, etc.), any of them falling within the scope of the present invention. In addition, different cycles may overlap over time so that a cycle may begin before the completion of the previous cycle, without thereby departing from the scope of the present invention. Of course, the combination of cycles and moulds should be adapted to the amount of moulds that are necessary to generate all desired segments, normally with the morphology and in a number suitable for installation of a predetermined tower.

In any case, each mould used in a method according to the present invention may be taken to another platform as de-moulding is carried out, to be re-used, preferably in another method according to the present invention for installing another tower.

It is noted that the platform does not include the site, even though in some cases, like in an embodiment described herein, the platform (10A) completely encloses the site (40A).

Naturally, within the principle of the invention it is possible to greatly vary the embodiments and constructive details from those described and depicted herein, without departing from the scope of the present invention.

Such variations can affect the shape, size and/or manufacturing materials.

The invention claimed is:

1. A method for installing a hollow concrete tower made from more than one segment, wherein the method comprises the following steps:
   a) arranging a tower site and a corresponding platform, wherein said platform is a working area located immediately adjoining or surrounding the tower site, excluding the tower site itself;
   b) arranging on said platform at least one partial full-segment mould in a position such that the segment axis of the segment to cast in said partial full-segment mould(s) is substantially vertical;
   c) pouring concrete inside said arranged partial full-segment mould(s);
   d) allowing the poured concrete to set to working strength, generating corresponding segment(s);
   e) removing said arranged partial full-segment mould(s) with concrete set to working strength, to leave said corresponding segment(s) exposed;
   f) assembling said corresponding exposed segment(s) by a crane arranged on the platform and moving the exposed segment(s) from the platform to the corresponding tower site; and
   g) stacking the exposed segments moved by the crane on top of each other, at the tower site;
   wherein each mould comprises a corresponding mould body, the mould body having an inner wall and an outer wall forming a shape complementary to the segment that the mould is meant to cast, the inner wall of the mould body being formed by multiple panels, each one of which has appropriate dimensions for conventional road transport, and the outer wall of the mould body being formed by multiple panels, each one of which has appropriate dimensions for conventional road transport, wherein the conventional road transportation is subject to limitations on dimensions and shipment weight of the transported panels on each road transporting vehicle, wherein each mould comprises a corresponding concrete supporting slab that rests on said platform, and a corresponding mould body that rests on a corresponding slab, the mould body having an inner wall and an outer wall, and wherein arranging on said platform a partial full-segment mould comprises: placing a shoring formed by a central metal lattice frame at the center of the slab coinciding with the axis of the resulting segment, and a plurality of arms that extend radially from said central frame; then placing the inner wall of the mould body attached to both registers of the slab and to the radially external ends of the bottom arms of said plurality of arms; and then placing the outer wall of the mould body attached to both registers of the slab and to the radially external ends of the upper arms of said plurality of arms.

2. The method according to claim 1, wherein said shoring has adjustment means to correct any misalignment with respect to the segment axis.

3. The method according to claim 1, wherein said hollow concrete tower comprises in their concrete walls an inner passive reinforcement made of conventional rebar, and wherein said rebar is fitted after placing the inner wall of the mould body and before placing the outer wall of the mould body.

4. The method according to claim 3, wherein said rebar is supplied divided into prefabricated elements, complementary to one another.

5. The method according to claim 4, wherein said rebar is divided into cages, and wherein initially a first cage is placed, provided with two radially internal overlapping arms that run from the central body of the initial cage in circumferentially opposite directions; then, a plurality of intermediate cages are placed, each one having two overlapping arms, one radially internal and one radially external, which run from the central body of each intermediate cage in circumferentially opposite directions; and finally a final cage is placed provided with two radially external overlapping arms that run from the central body of the final cage in circumferentially opposite directions.

6. The method according to claim 5, wherein after mould removal, said shoring is dismantled.

7. The method according to claim 1, wherein the inner wall of the mould body is formed by various panels, and the outer wall of the mould body is formed by various panels.

* * * * *